(12) United States Patent
Shubel

(10) Patent No.: US 9,760,416 B1
(45) Date of Patent: *Sep. 12, 2017

(54) MULTIPROCESSOR MESSAGING SYSTEM

(71) Applicant: EMC IP HOLDING COMPANY, LLC, Hopkinton, MA (US)

(72) Inventor: Paul A. Shubel, East Greenwich, RI (US)

(73) Assignee: EMC IP Holding Company LLC, Hopkinton, MA (US)

( * ) Notice: Subject to any disclaimer, the term of this patent is extended or adjusted under 35 U.S.C. 154(b) by 194 days.

This patent is subject to a terminal disclaimer.

(21) Appl. No.: 14/689,735

(22) Filed: Apr. 17, 2015

Related U.S. Application Data

(63) Continuation of application No. 13/251,151, filed on Sep. 30, 2011, now Pat. No. 9,037,838.

(51) Int. Cl.
*G06F 9/54* (2006.01)
*G06F 3/06* (2006.01)

(52) U.S. Cl.
CPC .............. *G06F 9/546* (2013.01); *G06F 3/067* (2013.01); *G06F 3/0608* (2013.01); *G06F 3/0646* (2013.01)

(58) Field of Classification Search
None
See application file for complete search history.

(56) References Cited

U.S. PATENT DOCUMENTS

| | | | |
|---|---|---|---|
| 5,448,716 A | 9/1995 | Hardell et al. | |
| 5,588,122 A * | 12/1996 | Garcia | G06F 13/24 710/48 |
| 5,933,261 A | 8/1999 | Fukui et al. | |
| 6,535,941 B1 * | 3/2003 | Kruse | G06F 13/362 710/113 |
| 6,914,914 B1 | 7/2005 | Flood et al. | |
| 7,483,173 B2 | 1/2009 | Sadowara | |
| 7,797,496 B2 * | 9/2010 | Gruber | G06F 15/16 711/147 |
| 7,809,970 B2 | 10/2010 | Arimilli et al. | |
| 2003/0120874 A1 * | 6/2003 | Deshpande | G06F 12/0811 711/141 |
| 2006/0271667 A1 | 11/2006 | Clow et al. | |
| 2007/0067529 A1 * | 3/2007 | Alsup | G06F 9/3004 710/200 |
| 2008/0046638 A1 * | 2/2008 | Maheshwari | G06F 12/0638 711/103 |
| 2008/0294876 A1 | 11/2008 | Chancel et al. | |
| 2010/0042823 A1 | 2/2010 | Arndt et al. | |

(Continued)

*Primary Examiner* — Eric Coleman
(74) *Attorney, Agent, or Firm* — Brian J. Colandreo; Mark H. Whittenberger; Holland & Knight LLP

(57) ABSTRACT

A multiprocessor system includes a first microprocessor and a second microprocessor. A first signaling pathway is configured to send message transmission coordination signals from the first microprocessor to the second microprocessor. The first signaling pathway may be coupled to at least two flag registers associated with the second microprocessor. A second signaling pathway is configured to send message transmission coordination signals from the second microprocessor to the first microprocessor. The second signaling pathway may be coupled to at least two flag registers associated with the first microprocessor. The first signaling pathway is independent of the second signaling pathway.

17 Claims, 2 Drawing Sheets

(56) References Cited

U.S. PATENT DOCUMENTS

| | | |
|---|---|---|
| 2010/0100705 A1 | 4/2010 | Shinozaki et al. |
| 2010/0115236 A1 | 5/2010 | Bataineh et al. |
| 2010/0223405 A1* | 9/2010 | Caltagirone .............. G06F 5/08 |
| | | 710/52 |

* cited by examiner

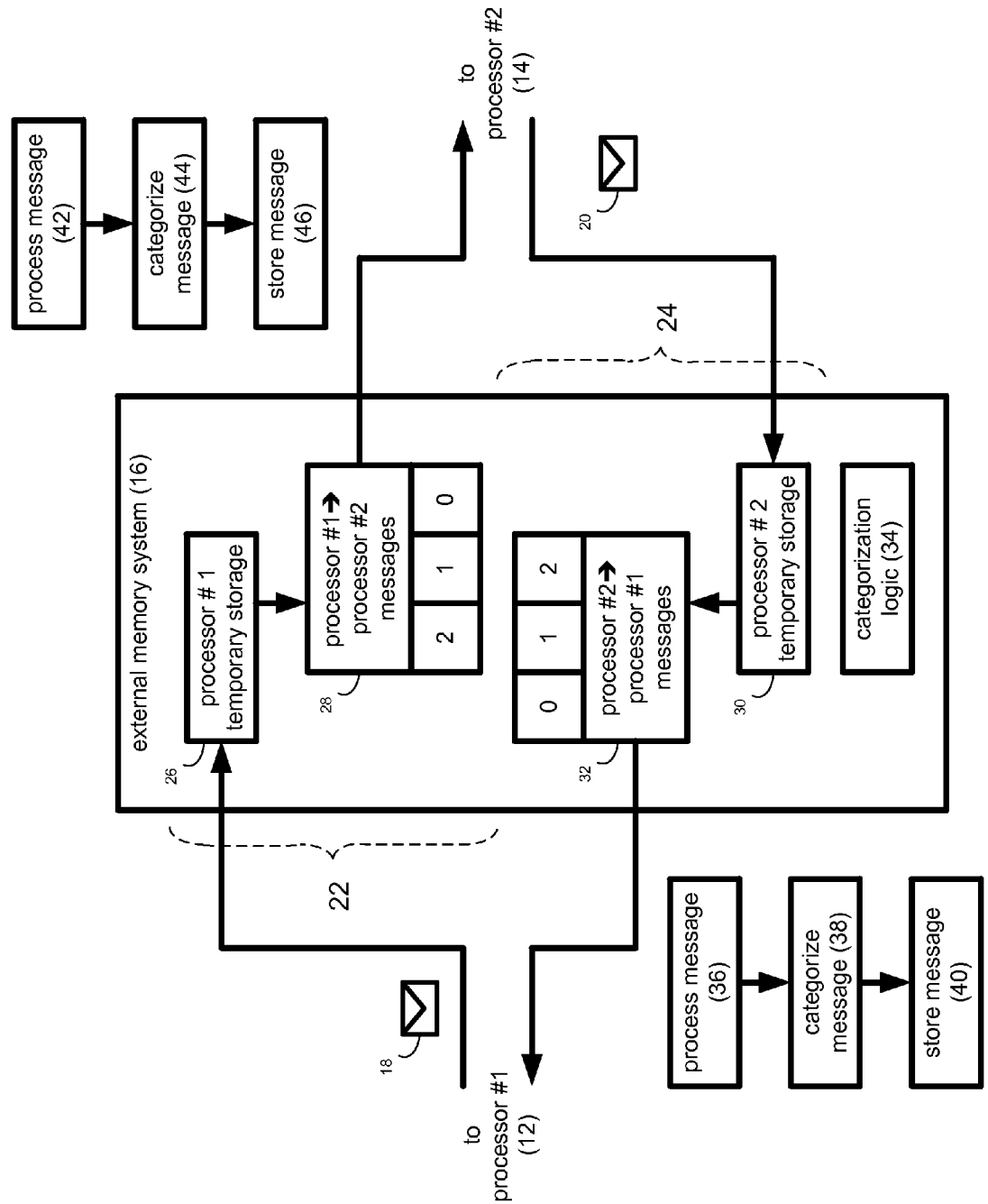

MULTIPROCESSOR MESSAGING SYSTEM

CROSS-REFERENCE TO RELATED APPLICATION

The subject application is a continuation of U.S. patent application Ser. No. 13/251,151, filed Sep. 30, 2011 and entitled "Multiprocessor Messaging System". The entire content of which is herein incorporated by reference.

TECHNICAL FIELD

This disclosure relates to messaging systems and, more particularly, to messaging systems that transfer messages between multiple microprocessors.

BACKGROUND

Computing devices often employ multiple microprocessors to increase efficiency and load balancing. Unfortunately, when multiple microprocessors are utilized, precise messaging system must be employed to ensure that these multiple microprocessors can properly communicate with each other. In the event that proper communication does not occur, errors may occur and the reliability of these multiprocessor systems may be compromised.

SUMMARY OF DISCLOSURE

In a first implementation, a multiprocessor system includes a first microprocessor and a second microprocessor. A first signaling pathway is configured to send message transmission coordination signals from the first microprocessor to the second microprocessor. The first signaling pathway may be coupled to at least two flag registers associated with the second microprocessor. A second signaling pathway is configured to send message transmission coordination signals from the second microprocessor to the first microprocessor. The second signaling pathway may be coupled to at least two flag registers associated with the first microprocessor. The first signaling pathway is independent of the second signaling pathway.

One or more of the following features may be included. An external memory system may be coupled to the first and second microprocessors and is configured to receive and temporarily store messages transferred between the first and second microprocessors. The external memory system may include dynamic random access memory. The external memory system may include flash memory.

The external memory system may be compartmentalized into a first portion configured to receive messages from the first microprocessor for the second microprocessor and a second portion configured to receive messages from the second microprocessor for the first microprocessor.

The first portion of the external memory system may be compartmentalized into a temporary storage area and a prioritized storage area and the external memory system may be configured to: process messages received by the temporary storage area from the first microprocessor for the second microprocessor, categorize the processed messages into one of a plurality of priorities; and store the categorized messages within the prioritized storage area. The second processor may be configured to retrieve the categorized messages from the prioritized storage area of the first portion of the external memory system.

The second portion of the external memory system may be compartmentalized into a temporary storage area and a prioritized storage area and the external memory system may be configured to: process messages received by the temporary storage area from the second microprocessor for the first microprocessor, categorize the processed messages into one of a plurality of priorities; and store the categorized messages within the prioritized storage area. The first processor may be configured to retrieve the categorized messages from the prioritized storage area of the second portion of the external memory system.

At least one of the first and second microprocessors may be a RISC microprocessor. At least one of the first and second microprocessors may be a system services processor.

In another implementation, a multiprocessor system includes a first microprocessor and a second microprocessor. A first signaling pathway is configured to send message transmission coordination signals from the first microprocessor to the second microprocessor. The first signaling pathway is coupled to at least two flag registers associated with the second microprocessor. A second signaling pathway is configured to send message transmission coordination signals from the second microprocessor to the first microprocessor. The second signaling pathway is coupled to at least two flag registers associated with the first microprocessor. An external memory system may be coupled to the first and second microprocessors and is configured to receive and temporarily store messages transferred between the first and second microprocessors. The first signaling pathway is independent of the second signaling pathway.

One or more of the following features may be included. The external memory system may be compartmentalized into a first portion configured to receive messages from the first microprocessor for the second microprocessor and a second portion configured to receive messages from the second microprocessor for the first microprocessor.

The first portion of the external memory system may be compartmentalized into a temporary storage area and a prioritized storage area and the external memory system may be configured to: process messages received by the temporary storage area from the first microprocessor for the second microprocessor, categorize the processed messages into one of a plurality of priorities; and store the categorized messages within the prioritized storage area. The second processor may be configured to retrieve the categorized messages from the prioritized storage area of the first portion of the external memory system.

The second portion of the external memory system may be compartmentalized into a temporary storage area and a prioritized storage area and the external memory system may be configured to: process messages received by the temporary storage area from the second microprocessor for the first microprocessor, categorize the processed messages into one of a plurality of priorities; and store the categorized messages within the prioritized storage area. The first processor may be configured to retrieve the categorized messages from the prioritized storage area of the second portion of the external memory system.

The details of one or more implementations are set forth in the accompanying drawings and the description below. Other features and advantages will become apparent from the description, the drawings, and the claims.

BRIEF DESCRIPTION OF THE DRAWINGS

FIG. 2 is a detail via of an external memory system included within the multiprocessor system of FIG. 1.

DETAILED DESCRIPTION OF THE PREFERRED EMBODIMENTS

Figure 1:
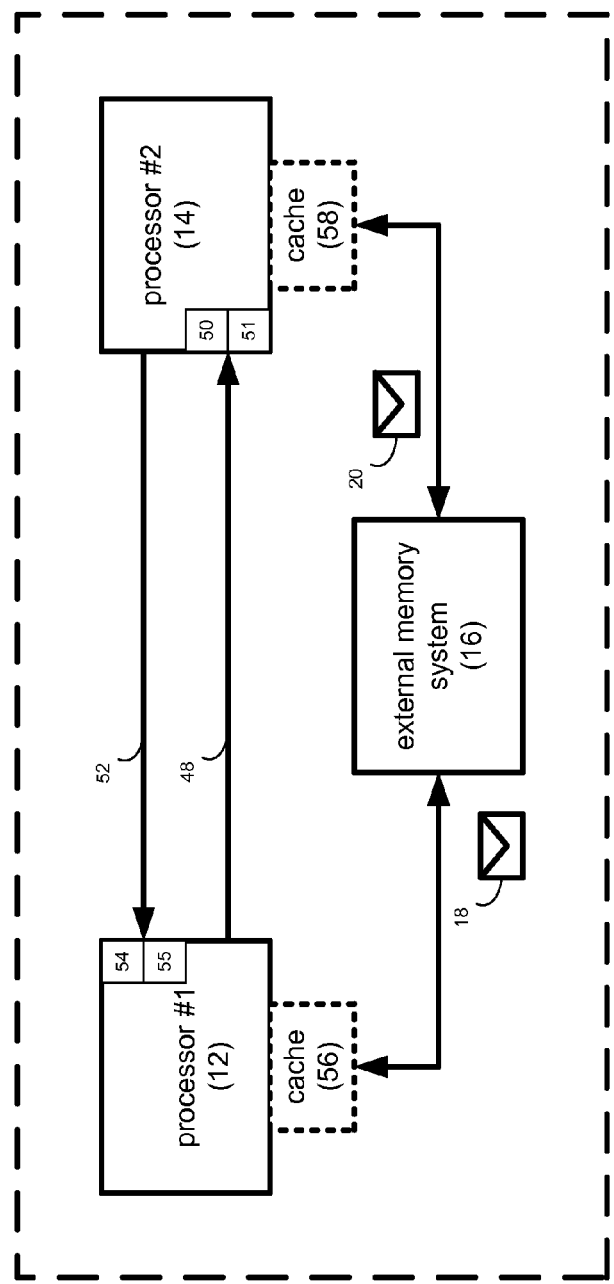
FIG. 1 is a diagrammatic view of a multiprocessor system.

Referring to FIGS. 1-2, there is shown multiprocessor system 10 that in this particular example includes first microprocessor 12 and second microprocessor 14. An example of multiprocessor system 10 may include but is not limited to a Pilot Integrated Baseboard Management Controller produced by Emulex Corporation of Costa Mesa, Calif. An example of first microprocessor 12 may include but is not limited to a RISC processor (e.g., an ARM processor produced by ARM Holdings of Cambridge, United Kingdom). An example of second microprocessor 14 may include but is not limited to an SSP processor (OpenRISC core) produced by opencores.org.

During operation of multiprocessor system 10, first microprocessor 12 and second microprocessor 14 may need to exchange information with each other in order to effectuate operation of multiprocessor system 10. For example, each of microprocessors 12, 14 may be configured to support separate and distinct tasks/functionality. For example, first microprocessor 10 may be configured to control ethernet access and other functionality within multiprocessor system 10, while second microprocessor 14 may be configured to control IO functions, control power, and perform arbitration functions. Accordingly, if first microprocessor 12 wishes to light a particular indicator LED within multiprocessor system 10, first microprocessor 12 may need to send a message to second microprocessor 14 requesting that the particular indicator LED be illuminated within multiprocessor system 10. Once this task is completed, second microprocessor 14 may need to send a message to first microprocessor 12 indicating that the particular indicator LED was illuminated within multiprocessor system 10.

In order to effectuate the passing of messages between e.g., first microprocessor 12 and second microprocessor 14, multiprocessor system 10 may include external memory system 16 that may be coupled to first and second microprocessors 12, 14 and may be configured to receive and temporarily store messages (e.g., messages 18, 20) transferred between first and second microprocessors 12, 14. Examples of external memory system 16 may include but are not limited to: dynamic random access memory and flash memory.

External memory system 16 may be compartmentalized into first portion 22 configured to receive messages (e.g., message 18) from first microprocessor 12 for second microprocessor 14; and second portion 24 configured to receive messages (e.g., message 20) from second microprocessor 14 for first microprocessor 12.

First portion 22 of external memory system 16 may be compartmentalized into temporary storage area 26 and prioritized storage area 28. Further, second portion 24 of external memory system 16 may be compartmentalized into temporary storage area 30 and prioritized storage area 32.

External memory system 16 may include categorization logic 34 configured to: process 36 messages (e.g., message 18) received by temporary storage area 26 from first microprocessor 12 for second microprocessor 14, categorize 38 the now processed messages (e.g., message 18) into one of a plurality of priorities; and store 40 the now categorized messages (e.g., message 18) within prioritized storage area 28.

Specifically, when first microprocessor 12 generates a message (e.g., message 18), first microprocessor 12 may assign a priority (e.g., 0, 1, 2) to e.g., message 18, wherein (in this example), 0 is a high importance message, 1 is a moderate importance message, and 2 is a low importance message. Accordingly, when categorizing 38 the now processed messages (e.g., message 18) into one of a plurality of priorities (e.g., 0, 1, 2), categorization logic 34 may store 40 the now categorized messages (e.g., message 18) within prioritized storage area 28 in one of a plurality of storage bins (which are illustrated to show priorities 0, 1, 2).

Second processor 14 may be configured to retrieve these now categorized messages from prioritized storage area 28 of first portion 22 of external memory system 16.

Categorization logic 34 within external memory system 16 may further be configured to: process 42 messages (e.g., message 20) received by temporary storage area 30 from second microprocessor 14 for first microprocessor 12, categorize 44 the now-processed messages (e.g., message 20) into one of a plurality of priorities; and store 46 the now categorized messages (e.g., message 20) within prioritized storage area 32.

Specifically, when second microprocessor 14 generates a message (e.g., message 20), second microprocessor 14 may assign a priority (e.g., 0, 1, 2) to e.g., message 20, wherein (in this example), 0 is a high importance message, 1 is a moderate importance message, and 2 is a low importance message. Accordingly, when categorizing 44 the now processed messages (e.g., message 20) into one of a plurality of priorities (e.g., 0, 1, 2), categorization logic 34 may store 46 the now categorized messages (e.g., message 20) within prioritized storage area 32 in one of a plurality of storage bins (which are illustrated to show priorities 0, 1, 2).

First processor 12 may be configured to retrieve these now categorized messages from the prioritized storage area 32 of second portion 24 of external memory system 16.

Multi-processor system 10 may include first signaling pathway 48 configured to send message transmission coordination signals from first microprocessor 12 to second microprocessor 14. First signaling pathway 48 may be coupled to two flag registers 50, 51 included within second microprocessor 14. Second signaling pathway 52 may be configured to send message transmission coordination signals from second microprocessor 14 to first microprocessor 12. Second signaling pathway 52 may be coupled to two flag registers 54, 55 included within first microprocessor 12. First signaling pathway 48 may be independent of second signaling pathway 52.

Specifically, flag registers 50, 51, 54, 55 act as flag bits that are asserted by signaling pathways 48, 52, providing notice to the related microprocessor that an action needs to be taken.

For example, if first microprocessor 12 wants to send message 18 to second microprocessor 14, first microprocessor 12 may clear flag register 54 included within first microprocessor 12 so that flag register 54 is ready to receive a message transmission coordination signals (in the form of an acknowledge signal) from second microprocessor 14.

First microprocessor 12 may then send message 18 to external memory system 16. Depending on how microprocessors 12, 14 are configured, this may be a multistep process. For example, one or more of microprocessors 12, 14 may include or use a cache memory system (e.g., cache memory systems 56, 58 respectively). Cache memory system 56 and/or cache memory system 58 may be included within or external to first microprocessor 12 and second microprocessor 14.

If a cache system is not used with first microprocessor 12, first microprocessor 12 may then directly transmit message 18 to external memory system 16. If a cache system (e.g., cache system 56) is used with first microprocessor 12, first microprocessor 12 may transmit message 18 to cache system 56. First microprocessor 12 may then invalidate cache system 56 to push message 18 down to external memory system 16.

First microprocessor 12 may then send, via first signaling pathway 48, a message transmission coordination signals (in the form of a message waiting signal) to let second microprocessor 14 know that message 18 is waiting for them in external memory system 16. This signal will, in turn, place the appropriate indicator into flag register 50 of second microprocessor 14.

As discussed above, external memory system 16 may include categorization logic 34 configured to: process 36 messages (e.g., message 18) received by temporary storage area 26 from first microprocessor 12 for second microprocessor 14, categorize 38 the now processed messages (e.g., message 18) into one of a plurality of priorities; and store 40 the now categorized messages (e.g., message 18) within prioritized storage area 28.

Further and as discussed above, when first microprocessor 12 generates a message (e.g., message 18), first microprocessor 12 may assign a priority (e.g., 0, 1, 2) to e.g., message 18, wherein (in this example), 0 is a high importance message, 1 is a moderate importance message, and 2 is a low importance message. Accordingly, upon being received by temporary storage area 26, the above-described categorization logic 34 may categorize 38 message 18. Assume for this example that message 18 was assigned priority 1 when generated by first microprocessor 18. Accordingly, categorization logic 34 may store 40 messages 18 within prioritized storage area 28 in the priority 1 storage bin.

Upon second microprocessor 14 receiving the above-described message waiting signal within flag register 50, second microprocessor 14 may retrieve the message(s) waiting for it on external memory system 16. When retrieving these message(s), second microprocessor 14 may retrieve these message(s) in accordance with priority (e.g., 0 priority messages first, 1 priority messages second, and 2 priority messages third).

The manner in which second microprocessor 14 retrieves message 18 from external memory system 16 may vary depending on how second microprocessor 14 is configured (e.g., whether or not a cache system is utilized by second microprocessor 14). If a cache system is not used with second microprocessor 14, second microprocessor 14 may directly retrieve message 18 from external memory system 16. If a cache system (e.g., cache memory system 58) is used with second microprocessor 14, second microprocessor 14 may retrieve message 18 from external memory system 16 and place message 18 into cache memory system 58. Second microprocessor 14 may then invalidate cache memory system 58 to push message 18 from cache memory system 58 to second microprocessor 14.

Once message 18 is retrieved, second microprocessor 14 may then send, via second signaling pathway 52, a message transmission coordination signals (in the form of a message received signal) to let first microprocessor 12 know that message 18 was successfully received by second microprocessor 14. This signal will, in turn, place the appropriate indicator into flag register 54 of first microprocessor 12.

The above-described system may work in an equivalent fashion to send messages from second microprocessor 14 to first microprocessor 12. However, flag registers 51, 55 will be used instead of flag registers 50, 54.

A number of implementations have been described. Nevertheless, it will be understood that various modifications may be made. Accordingly, other implementations are within the scope of the following claims.

What is claimed:

1. A multiprocessor system comprising:
   a first microprocessor;
   a second microprocessor;
   a first signaling pathway for sending message transmission coordination signals from the first microprocessor to the second microprocessor;
   a second signaling pathway for sending message transmission coordination signals from the second microprocessor to the first microprocessor; and
   an external memory system coupled to the first and second microprocessors, wherein the external memory system includes a first portion compartmentalized into a temporary storage area and a prioritized storage area, wherein the external memory system is configured to:
   process messages received by the temporary storage area from the first microprocessor for the second microprocessor; and
   store the processed messages within the prioritized storage area;
   wherein the first signaling pathway is independent of the second signaling pathway.

2. The multiprocessor system of claim 1 wherein the external memory system is configured to receive and temporarily store messages transferred between the first and second microprocessors.

3. The multiprocessor system of claim 2 wherein the external memory system includes dynamic random access memory.

4. The multiprocessor system of claim 2 wherein the external memory system includes flash memory.

5. The multiprocessor system of claim 2 wherein the external memory system is compartmentalized into the first portion configured to receive messages from the first microprocessor for the second microprocessor and a second portion configured to receive messages from the second microprocessor for the first microprocessor.

6. The multiprocessor system of claim 5 wherein the processed messages are categorized into one of a plurality of priorities prior to storing the processed messages within the prioritized storage area.

7. The multiprocessor system of claim 6 wherein the second processor is configured to retrieve the categorized messages from the prioritized storage area of the first portion of the external memory system.

8. The multiprocessor system of claim 5 wherein the second portion of the external memory system is compartmentalized into a temporary storage area and a prioritized storage area and the external memory system is configured to:
   process messages received by the temporary storage area from the second microprocessor for the first microprocessor,
   categorize the processed messages into one of a plurality of priorities; and
   store the categorized messages within the prioritized storage area.

9. The multiprocessor system of claim 8 wherein the first processor is configured to retrieve the categorized messages from the prioritized storage area of the second portion of the external memory system.

10. The multiprocessor system of claim 1 wherein at least one of the first and second microprocessors is a RISC microprocessor.

11. The multiprocessor system of claim 1 wherein at least one of the first and second microprocessors is a system services processor.

12. A multiprocessor system comprising:
- a first microprocessor;
- a second microprocessor;
- a first signaling pathway for sending message transmission coordination signals from the first microprocessor to the second microprocessor;
- a second signaling pathway for sending message transmission coordination signals from the second microprocessor to the first microprocessor; and
- an external memory system coupled to the first and second microprocessors and configured to receive and temporarily store messages transferred between the first and second microprocessors, wherein the external memory system includes a first portion compartmentalized into a temporary storage area and a prioritized storage area, wherein the external memory system is configured to:
  - process messages received by the temporary storage area from the first microprocessor for the second microprocessor; and
  - store the processed messages within the prioritized storage area;
- wherein the first signaling pathway is independent of the second signaling pathway.

13. The multiprocessor system of claim 12 wherein the external memory system is compartmentalized into the first portion configured to receive messages from the first microprocessor for the second microprocessor and a second portion configured to receive messages from the second microprocessor for the first microprocessor.

14. The multiprocessor system of claim 13 wherein the processed messages are categorized into one of a plurality of priorities prior to storing the processed messages within the prioritized storage area.

15. The multiprocessor system of claim 14 wherein the second processor is configured to retrieve the categorized messages from the prioritized storage area of the first portion of the external memory system.

16. The multiprocessor system of claim 13 wherein the second portion of the external memory system is compartmentalized into a temporary storage area and a prioritized storage area and the external memory system is configured to:
- process messages received by the temporary storage area from the second microprocessor for the first microprocessor,
- categorize the processed messages into one of a plurality of priorities; and
- store the categorized messages within the prioritized storage area.

17. The multiprocessor system of claim 16 wherein the first processor is configured to retrieve the categorized messages from the prioritized storage area of the second portion of the external memory system.

* * * * *